UNITED STATES PATENT OFFICE 2,551,134

PROCESS OF COLOR DEVELOPING WITH 2-THIOHYDANTOIN DERIVATIVES

Andrew Bradshaw Jennings, New Brunswick, N. J., assignor to E. I. du Pont de Nemours & Company, Wilmington, Del., a corporation of Delaware No Drawing. Application May 15, 1947, Serial No. 748,339

4 Claims. (Cl. 95—6)

This invention relates to photography and, more particularly, to processes of forming dye images by color coupling development of silver salt images and to developer compositions and elements therefor. Still more particularly it relates to such processes, compositions, and elements wherein 2-thiohydantoins or their 1- and/or 3-derivatives are utilized.

The pyrazolones have been favored as minus-green or magenta color formers in processes of color photography utilizing color coupling development of latent silver images. This class of compounds, while useful, does not offer sufficient latitude in multicolor photography. In general, the pattern of spectral absorption of the known azomethine dyes obtained therefrom is characterized by two maxima of absorption in the visible spectrum, the greater one being in the range 510 to 555 millimicrons and the lesser one in the range from 440 to 455 millimicrons. Thus, these azomethine dyes have an undesirable absorption in the blue region of the spectrum.

An object of this invention is to provide new and improved processes of color photography. Another object is to provide new processes of forming minus-green dye images. A related object is to provide new developers and elements for obtaining such images. Still other objects will be apparent from the following description of the invention.

It has been discovered that 2-thiohydantoin and its 1- and/or 3-hydrocarbon substituted derivatives form azomethine dyes during the color development of silver halide latent images with primary, aromatic, amino, developing agents. These compounds may be represented by the general formula:

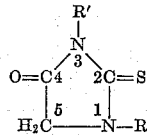

where R and R' represent a member taken from the group consisting of hydrogen and hydrocarbon radicals, e. g., alkyl, alkenyl, and aryl radicals. Particularly valuable are the compounds in which R' is an alkyl radical, e. g., methyl, ethyl, isopropyl, hexyl, dodecyl, hexadecyl, etc., and in which R is alkyl, e. g., methyl, ethyl, isopropyl, hexyl, dodecyl, hexadecyl, or aryl, especially aryl, e. g., phenyl, naphthyl. The radicals just mentioned may be substituted by various substituents which are commonly present in color formers including halogen, e. g., chlorine and bromine; carboxylic acid and sulfonic acids and their water-soluble salts with alkali metals, ammonia, and amines; alkoxy, nitro, acylamido, etc., which groups do not enter into color coupling reactions.

The compounds may be of relatively low molecular weight when R and R' are hydrogen or alkyl of not more than five carbon atoms or alkyl and aryl, such as phenyl, or of relatively high molecular weight when R and R' are relatively high molecular weight groups. Thus, when R and/or R' are alkyl radicals of eight or more carbon atoms or contain such radicals, the resulting compounds are relatively fast to diffusion.

The 2-thiohydantoins which contain an aminophenyl or aminonaphthyl group in the 1 or 3 position as R or R' can be made fast to diffusion by acylating the —NH₂ group with a long chain aliphatic, carboxylic acid chloride or bromide or methyl or ethyl ester, or with an aromatic, carboxylic or sulfonic acid chloride or bromide, or with a polymeric acid, e. g., polyacrylic acid, styrene-maleic acid interpolymer, ethylene-maleic acid interpolymer, mixed polymers of polyacrylic acid with styrene, vinyl chloride.

The thiohydantoins likewise may be introduced into the structure of polymeric materials, for example by acetal formation wherein an aldehyde structure or a simple acetal such as the dimethyl acetal or the ethylene glycol acetal is caused to undergo acetalization or acetal interchange with hydroxyl polymers such as polyvinyl alcohol, hydrolyzed alkylene-vinylacetate interpolymers, or "glyptal" resins containing hydroxyl groups. Similarly, the thiohydantoin nuclei may be introduced, through ether linkages, into hydroxyl polymers and other polymers as described in United States Patents 2,397,865, 2,397,867 and polyamides as disclosed in United States application Serial Number 528,944, filed March 31, 1944, now Patent No. 2,423,460.

The 2-thiohydantoins referred to above form azomethine dyes during color coupling development of latent silver halide images with alkaline developer solutions containing p-amino-N-diethylaniline hydrochloride, which are comparatively opaque to light within the green region of the spectrum and transmit a large percentage of light within the blue and red regions of the spectrum. The superior transmission of blue light by dyes formed by the 2-thiohydantoins coming within the invention, as compared with representative pyrazolones, results in a super reproduction of a multicolor picture or scene. Since an ideal magenta should absorb little or no blue light, it becomes necessary in three-color subtractive reproduction to adjust for blue absorption when employing a magenta which exhibits blue absorption. The yellow printing component, which should ordinarily account for all or most of the absorption of blue light, must be decreased in printing density when partial blue absorption takes place in the magenta. As a consequence, all colors in the reproduction containing yellow, i. e., yellows, oranges, and reds, are improperly represented since they contain less than ideal amounts of yellow.

Various 2-thiohydantoins are known and other derivatives can be made by the general prior art procedures. They have been prepared from glycine and mustard oil or derivatives of such materials. A practical method of preparing the compounds is by heating an isothiocyanate with an N-substituted glycine. This reaction takes place in accordance with the equation:

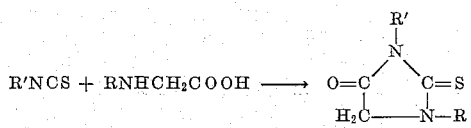

wherein R and R' have the previous significance.

Color-yielding photographic emulsions and emulsion layers can be made by incorporating the 2-thiohydantoin color formers with water-permeable colloid silver halide emulsion prior to coating. The emulsion is preferably brought to its proper sensitivity and the color former added just before coating. It may be added from solution in a solvent, e. g., ethyl alcohol or methyl alcohol or mixtures thereof with up to 50% of water with or without the addition of alkali. Water-soluble compounds of this type containing sulfonic or carboxylic acid or salt groups can be added from aqueous solutions. Dispersions of the color formers in water can be made by means of wetting and dispersing agents and the resulting dispersions mixed with the flowable silver halide emulsions. In general, from 0.5 to 5.0 parts of color former should be present for each 100 parts of silver halide emulsion.

It is advisable to use color formers of the type in question which are non-diffusing in water-permeable colloid layers, such as gelatin or hydrophilic polymer layers, so that the compounds do not migrate from layer to layer in a multi-layer photographic element or into the processing solutions.

Novel developer compositions can be made by admixing the 2-thiohydantoin color formers with the primary, aromatic, amino, developing agent and alkaline material, e. g., sodium carbonate, potassium carbonate, sodium hydroxide, lithium hydroxide; preservatives, e. g., lithium, sodium, potassium, and ammonium sulfites and bisulfites, amine salts of sulfurous acids, for example, triethanolamine sulfite, morpholine sulfite, tetramethylammonium sulfite, trimethylbenzylammonium sulfite; restrainers, e. g., sodium, potassium, and lithium chlorides, bromides and iodides, ammonium bromide; other ingredients, e. g., emulsion hardeners, for example, potassium aluminum sulfate, chrome alum; buffering salts, e. g., disodium hydrogen phosphate, sodium metaborate, borax. The solutions or compositions may be made in two parts, if desired, which are mixed at the time of use. Wetting and dispersing agents may be used, if desired, to facilitate uniform distribution of the color formers. Alkali metal alkyl sulfates of 8 to 18 carbon atoms, alkali metal salts of n-alkane sulfonic acids of 8 to 18 carbon atoms, alkyl naphthalene sulfonic acid alkali metal salts, etc., may be used as such agents.

The color formers of this invention need not be present in light-sensitive silver halide layers of photographic elements. They may be placed in water-permeable layers that are in operative contact with silver halide layers. Thus, they can be admixed with water-permeable colloids, e. g., gelatin, albumin, agar-agar, water-permeable polyamides, polyvinyl alcohol partially hydrolyzed polyvinyl esters, polyvinyl acetals, cellulose esters and others, etc., and the coating solutions deposited onto a base or a water-permeable colloid silver halide emulsion layer. In a multilayer element the color-yielding layer may be above or below the appertaining silver halide layer.

The invention will be further illustrated but is not intended to be limited by the following examples.

*Example I*

Three and nine-tenths grams (3.9) of the monopotassium salt of N-(p-carboxyphenyl) glycine is mixed with 2.48 grams of allyl isothiocyanate in an aqueous ethanol solution containing such liquids in approximately equal volumes and containing also 1.12 grams of potassium hydroxide. The solution was heated under reflux conditions for about two hours. The free 1-(p-carboxyphenyl)-3-allyl-2-thiohydantoin is liberated by the addition of an excess of concentrated hydrochloric acid and isolated by filtration. The 1-(p-carboxyphenyl)-3-allyl-2-thiohydantoin has a melting point of 191.5 to 194° C. and is obtained in a yield of 59%.

To hot ethanol is added 1.5 grams of the compound just prepared and the solution added to 1000 cc. of a developer of the following composition:

| | | |
|---|---|---|
| p-Aminodiethylaniline hydrochloride | grams | 2 |
| Sodium sulfite (anhydrous) | do | 10 |
| Sodium carbonate | do | 20 |
| Potassium bromide | do | 2 |
| Water to | cc | 1000 |

An exposed film bearing a gelatino-silver iodobromide layer is developed five minutes in the solution and the silver and silver salts removed by fixing in plain hypo, washing, bleaching with potassium ferricyanide, and fixing again. A clear, magenta image of good strength and brilliancy is formed in the layer. It is characterized by relatively low absorption in the blue part of the spectrum.

*Example II*

A mixture of 19.5 grams of N-(p-carboxyphenyl) glycine, 5.61 grams of potassium hydroxide, 10.5 grams of ethyl isothiocyanate, 120 cc. of water, and 120 cc. of ethanol is heated under reflux conditions for two hours. The reaction mixture is cooled and an excess of concentrated hydrochloric acid is added. The 1-(p-carboxyphenyl)-3-ethyl-2-thiohydantoin formed is filtered and recrystallized from ethanol. It is obtained in a yield of 67% and has a melting point of 218 to 219.5° C.

A similar reaction was carried out but using 6.9 grams of potassium carbonate (anhydrous) and 1-(p-carboxyphenyl)-3-ethyl-2-thiohydantoin was recovered in like manner in a yield of 83.5%.

The compound is added to a developer solution of the type set forth in Example I and an exposed film developed in like manner with similar results.

*Example III*

A mixture of 4.75 grams iminodiacetonitrile, 4.0 grams sodium hydroxide, and 50 cc. of water was allowed to stand for 65 hours. During this time ammonia was evolved from the solution. The solution was boiled for three hours, cooled, and partially neutralized with 4.15 cc. of 12 N HCl. At this time the pH of the reaction mixture is approximately 6. The solution is evaporated to 20 cc. and added to 4.95 grams of allyl isothiocyanate and 40 cc. of ethanol and heated under reflux for six hours. The mixture is then heated three hours further without reflux to remove low boiling materials. Fifty cubic centimeters (50 cc.) of benzene is then added and boiled off. To the residue is added 125 cc. of absolute ethanol containing 6% dry HCl and the mixture heated under reflux for two and one-half hours. The mixture is then filtered and the white solid washed with 30 cc. of hot ethanol. The combined filtrates were evaporated to an oily material, 20 cc. of water was added and made slightly basic with ammonium hydroxide. The resulting mixture was extracted with two 25 cc. portions of chloroform which was then concentrated to an oil and triturated with petroleum ether. A white, crystalline solid, melting at 64–68.5° C., was formed. After two recrystallizations from ethanol, the melting point of the 1-carbethoxymethyl-3-allyl-2-thiohydantoin was raised to 70–71° C.

A baryta coated photographic paper bearing an exposed gelatino-silver iodobromide layer is developed in a developer solution of the type described in Example I to which 1.5 grams of 1-carbethoxymethyl-3-allyl-2-thiohydantoin is added. A brilliant, magenta, azomethine dye image is formed in situ with the silver image. The silver and silver salts are removed as in Example I. The magenta, azomethine dye has a minimum reflectance and maximum absorption at about 525 millimicrons.

The corresponding 1-carbethoxymethyl-3-methyl-2-thiohydantoin can be prepared by substituting equivalent amounts of methyl isothiocyanate for the allyl isothiocyanate. It yields a similar azomethine dye upon color coupling development.

*Example IV*

A solution of 6.97 grams of 1-phenyl-3-allyl-2-thiohydantoin in 150 cc. of absolute ethanol is shaken under a hydrogen pressure of about 27 pounds with platinum oxide catalyst for 50 minutes. A pressure drop of 1.2 pounds is obtained in 35 minutes. The mixture is filtered and the solution evaporated to about 5 cc. Upon cooling, an orange solid separated. After two recrystallizations from methanol the melting point was 66.5–68° C.

One and one-half grams (1.5) of this 1-phenyl-3-propyl-2-thiohydantoin was dissolved in hot ethanol and added to 1000 cc. of a developer of the composition described hereafter in developing a photographic film bearing an exposed gelatino-silver halide emulsion layer.

| | Parts |
|---|---|
| p-Aminodiethylaniline hydrochloride | 2 |
| Sodium sulfite (anhydrous) | 10 |
| Sodium carbonate (anhydrous) | 20 |
| Potassium bromide | 2 |
| Water to make | 1000 |

A bright, clear, magenta image was obtained after removal of the silver and silver salts.

*Example V*

One gram of 1-(p-hydroxyphenyl)-3-ethyl-thiohydantoin is mixed with 1 cc. of 20% sodium hydroxide, 8 cc. of ethanol, and 10 cc. of water and the resulting solution added to 100 cc. of a flowable, gelatino-silver iodobromide emulsion. Three cubic centimeters of 5% sodium carbonate, 3 cc. of 5% sodium dodecylsulfate and 40 cc. of water is added and the pH adjusted to 7.5 with dilute hydrochloric acid. The resulting solution is coated onto a cellulose acetate film base and dried. The resulting element, when exposed and color developed in a solution of the composition set forth in Example I without the 2-thiohydantoin color former, yields a good magenta dye image in situ with the developed silver image. The silver and silver salts can be removed by means of Farmer's reducer.

*Example VI*

To 100 cc. of a positive type gelatino-silver iodobromide emulsion is added 1 cc. of 5% sodium carbonate solution, 3 cc. of a 5% solution of sodium dodecylsulfate and 40 cc. of water. One gram of 1-phenyl-3-ethyl-2-thiohydantoin is added to 1 cc. of 20% sodium hydroxide and ethanol is added to make 20 cc. of solution which is added to the flowable emulsion just described. The resulting color forming emulsion is coated onto a cellulose acetate film base and dried. The film element is exposed and developed in a color developer of the type described in Example I without any 2-thiohydantoin and then treated in 3.5% sodium ferricyanide solution and then in 20% sodium thiosulfate to remove the developed silver and remaining silver salts. The resulting element contained a magenta azomethine dye image which has good spectral qualities for three-color subtractive photography. The film element is characterized by being substantially free from color stain.

*Example VII*

Three grams of 1-phenyl-3-allyl-2-thiohydantoin is added to a developer solution of the following composition:

p-Aminodiethylaniline hydrochloride
| | | |
|---|---|---|
| | grams | 4 |
| Sodium carbonate (anhydrous) | do | 60 |
| Potassium bromide | do | 3 |
| Sodium sulfite (anhydrous) | do | 30 |
| Water to make | cc | 1000 |

An exposed film element bearing a latent silver halide image in a gelatino-silver iodobromide emulsion layer is developed in the above solution for five minutes, then bleached in 3.5% potassium ferricyanide solution, washed, fixed in 20% sodium thiosulfate, washed, and dried. A magenta, azomethine dye image of good strength and brilliancy is formed. It has a maximum absorption at 520 millimicrons.

A similar developer solution is made by substituting 2-amino-5-diethylamino-toluene hydrochloride for the p-amino-diethylaniline hydrochloride. An exposed film element was then developed in the solution and processed in a similar manner. A strong, brilliant, magenta dye image is obtained which has a maximum absorption at 525 millimicrons.

*Example VIII*

Sodium p-(3-alkyl-2-thiohydantoin-1-yl) benzene sulfonate is made by reacting sodium (p- carboxymethylamino) benzenesulfonate with methyl or ethyl isothiocyanate by heating in an admixture of these two compounds in aqueous ethanol under reflux conditions. The resulting compounds form magenta azomethine dye intermediates upon color coupling development of exposed silver halides with p-aminodiethylaniline hydrochloride.

The sodium (p-carboxymethylamino)benzene sulfonate is prepared as follows: To a solution of 34.6 grams of sulfanilic acid, 14.9 grams of sodium carbonate monohydrate, 15.6 cc. of 40% aqueous formaldehyde solution, and 10.7 grams of sodium cyanide in 175 cc. of water is added 37.5 cc. of concentrated hydrochloric acid. The resulting slurry, having a pH of 3.5, is stirred on the steam bath for three hours and allowed to stand overnight at room temperature. Twenty-four (24) grams of sodium hydroxide is then added and the solution boiled until ammonia no longer evolves. The volume is maintained at about 250 cc. by the addition of water. The alkaline solution is then boiled with decolorizing charcoal, filtered, and acidified to pH 2.5 with 37.5 cc. of concentrated hydrochloric acid. The solution is cooled and 37.7 grams of a cream colored product isolated by filtration.

*Example IX*

A multilayer film for three-color printing is made by coating a gelatino-silver iodobromide emulsion sensitized with 3,3'-diethyl-6,7,6',7'-dibenzoselenocarbocyanine bromide in which is dispersed as a yellow color former methylene bis-benzoylacetanilide. A gelatin layer containing Tartrazine (Color Index No. 640) is coated on said emulsion layer. A gelatino-silver iodobromide emulsion containing as a magenta color former 1-phenyl-3-allyl-thiohydantoin is coated on the yellow filter layer. The other side of the base is coated with a dispersion of comminute silver in gelatin to form a thin antihalation layer. A gelatino-silver iodobromide emulsion containing as a cyan color former bis-(1-naphthol-2-sulfonamido)phenyl ether is coated onto said antihalation layer. A gelatin solution is then coated onto the latter emulsion layer to form an antiabrasion layer.

The resulting element can be printed from color separation negatives, developed in a developer solution of the kind described in Example I without any color former, then bleached in 3.5% potassium ferricyanide solution, and fixed in 20% sodium thiosulfite solution. A multicolor picture in the form of dyestuff images remains. The magenta image is clear, strong, and brilliant.

*Example X*

A similar film element is made by depositing on one side of a cellulose acetate film base an antihalation layer of gelatin containing comminute silver. Then a red-sensitive gelatino-silver iodobromide emulsion containing the cyan color former of the previous example, next a green-sensitive gelatino-silver iodobromide emulsion containing a magenta color former of said example, next a gelatin layer containing yellow colloidal silver, and finally a blue-sensitive gelatino-silver iodobromide emulsion containing the yellow color former of the previous example. The resulting element may be exposed to a multicolor scene and when processed as described in that example gives a complementary colored negative image.

In place of the particular substituted 2-thiohydantoins described in the previous example, there may be substituted the following 2-thiohydantoins with similar results.

1-phenyl-2-thiohydantoin
1-phenyl-3-ethyl-2-thiohydantoin
1-phenyl-3-propyl-2-thiohydantoin
1-phenyl-3-allyl-2-thiohydantoin
1-phenyl-3-cetyl-2-thiohydantoin
1-phenyl-3-stearyl-2-thiohydantoin
1-(p-sulfophenyl)-3-ethyl-2-thiohydantoin
1-(p-sulfophenyl)-3-allyl-2-thiohydantoin
1-carbethoxymethyl-3-allyl-2-thiohydantoin
1-(p-carboxyphenyl)-3-allyl-2-thiohydantoin
1-(p-carboxyphenyl)-3-ethyl-2-thiohydantoin
1-(p-hydroxyphenyl)-3-ethyl thiohydantoin
1-(p-hydroxyphenyl)-3-allyl-2-thiohydantoin
1-isobutyl-3-phenyl-2-thiohydantoin In addition to the thiohydantoin color formers which exhibit the active methylene ring structure, there may be employed similarly esters and acyl derivatives of the enol form, namely the 2-imidazolinethiones of the structure

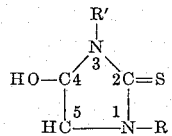

For example, there may be employed, the 4-(ethyl carbonato)-, 4-acetyl-, 4-benzoyl-, etc., derivatives. An example of such a compound is 1-(p-carboxyphenyl)-3-ethyl-4-(ethyl carbonato)-2-imidazolinethione.

The 2-thiohydantoin color formers can be used with various other primary, aromatic, amino, developing agents. The preferred developing agents are derivatives of p-phenylenediamine and particularly the asymmetric dialkyl p-phenylenediamines, e. g., p-aminodimethylaniline, p-aminodiethylaniline, p-aminodibutylaniline, etc. Other developing agents which may be used include p-phenylenediamine itself, p-methylaminoaniline, p-ethylaminoaniline, N,N-diethyl-o-phenylenediamine, chloro-p-phenylenediamine, 1,2,5-toluylenediamine, 2-amino-5-diethylaminotoluene, N-p-aminophenylpiperidine, N-methyl-N-hydroxyethyl-p-phenylenediamine, N-butyl-N-hydroxy-ethyl-p-phenylenediamine, beta-gamma-dihydroxypropyl-p-phenylenediamine, 2-amino-5-(N-beta-hydroxy-ethyl-N-butyl) aminotoluene and its dihydrochloride, etc. These aromatic amine developing agents may be used in the form of their salts, which may be organic or inorganic. The salts are, in general, more stable and soluble than the free bases. As examples of suitable salts mention is made of the hydrochloride, sulfates, acetates, etc.

The 2-thiohydantoin color formers provide a novel class of compounds which can be used as magenta color formers in place of pyrazolone derivatives. Certain of the 2-thiohydantoins are superior to pyrazolones, such as 1,3-diphenylpyrazolone.

The undesired absorption in the blue part of the spectrum in the hitherto available magenta color formers has been a serious drawback in subtractive color processes, since such excessive absorption results in desaturation of oranges, yellows and reds, and dulls the blues. The low blue absorption of the thiohydantoin magentas permits a fuller scale of magenta densities to be used in the color reproduction.

What is claimed is:

1. The process which comprises developing a photographic element bearing at least one exposed colloid-silver halide emulsion layer with a primary, aromatic, amino, developing agent in the presence of a compound of the general formula:

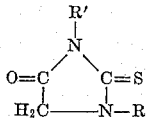

wherein R is taken from the group consisting of alkyl, phenyl, p-sulfophenyl, and p-carboxyphenyl and R' is a hydrocarbon radical taken from the group consisting of alkyl and alkenyl.

2. The process which comprises developing a photographic element bearing at least one exposed colloid-silver halide emulsion layer with a primary, aromatic, amino, developing agent in the presence of a compound of the formula:

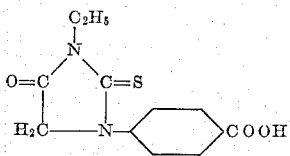

3. The process which comprises developing a photographic element bearing at least one exposed colloid-silver halide emulsion layer with a primary, aromatic, amino, developing agent in the presence of a compound of the formula:

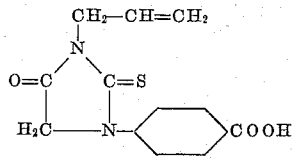

4. The process which comprises developing a photographic element bearing at least one exposed colloid-silver halide emulsion layer with a primary, aromatic, amino, developing agent in the presence of a compound of the formula:

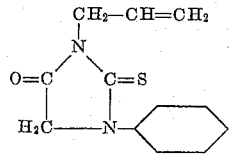

ANDREW BRADSHAW JENNINGS.

REFERENCES CITED

The following references are of record in the file of this patent:

UNITED STATES PATENTS

| Number | Name | Date |
|---|---|---|
| 2,296,306 | Peterson | Sept. 22, 1942 |
| 2,308,023 | Peterson | Jan. 12, 1943 |
| 2,353,754 | Peterson | July 18, 1944 |

FOREIGN PATENTS

| Number | Country | Date |
|---|---|---|
| 524,557 | Great Britain | Aug. 8, 1940 |